Figure 1:
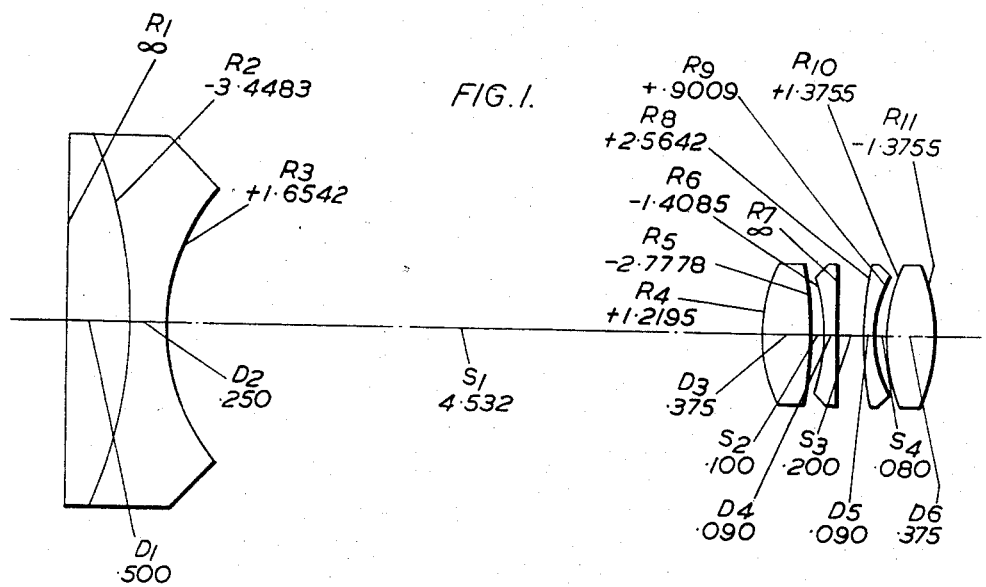

Nov. 29, 1955   G. H. COOK   2,724,993
OPTICAL OBJECTIVES OF THE INVERTED TELEPHOTO TYPE
Filed June 2, 1952

Inventor
GORDON H. COOK
By Emery Holcombe Blair
Attorneys

United States Patent Office 2,724,993
Patented Nov. 29, 1955

2,724,993

OPTICAL OBJECTIVES OF THE INVERTED TELEPHOTO TYPE

Gordon Henry Cook, Leicester, England, assignor to Taylor, Taylor & Hobson Limited, Leicester, England, a British company Application June 2, 1952, Serial No. 291,199

Claims priority, application Great Britain June 5, 1951

25 Claims. (Cl. 88—57)

This invention relates to an optical objective corrected for spherical and chromatic aberrations, coma, astigmatism and field curvature, and of the kind often known as an "inverted telephoto" objective, that is one in which the back focal distance is greater than the equivalent focal length of the objective, the objective comprising a divergent front member widely separated from a convergent rear member. It should be made clear that the terms "front" and "rear" as used herein relate to the sides of the objective respectively nearer to and further from the longer conjugate. Such objectives hitherto have tended to suffer rather badly from the zonal aberrations and distortion.

The objective according to the invention, although not limited thereto, is especially suitable for very short focal lengths and fairly wide angular fields. It is well known that conventional objectives for very short focal lengths, of the order, say, of a quarter of an inch, present considerable difficulty in manufacture owing to their small size and normal mounting procedure tends to aggravate vignetting difficulties in such sizes.

The present invention has for its object to provide an inverted telephoto objective which will have improved correction, especially for zonal aberrations and for distortion and which, when used in very short focal lengths, can have relatively large components which are easier to manufacture and improve conditions as regards vignetting.

In the objective according to the present invention, the divergent front member is located in front of the front focal point of the convergent rear member and includes at least one collective surface concave to the front and at least one dispersive surface convex to the front, and the convergent rear member consists of four components of which the outer two are convergent and the inner two simple and divergent, the two outer of the three air separations in the rear member having the shape of a convergent meniscus lens with surfaces convex towards the central air separation of the rear member, the overall axial length of the rear member lying between .5 $f_2$ and 1.0 $f_2$, where $f_2$ is the equivalent focal length of the rear member. The two convergent outer components of the rear member are preferably in the form of simple elements. Preferably, at least one of the divergent inner components of the rear member is of meniscus form.

The front surface of the divergent second component of the rear member preferably has radius of curvature greater than .5 $f_2$ and less than .75 times the radius of curvature of the rear surface of the convergent front component of the rear member.

The rear surface of the divergent third component of the rear member preferably has radius of curvature greater than .3 $f_2$ and less than .8 times the radius of curvature of the front surface of the convergent rear component of the rear member.

The three air separations of the rear member, counting from the front, preferably have axial lengths respectively between .03 $f_2$ and .08 $f_2$, between .06 $f_2$ and .16 $f_2$, and between .02 $f_2$ and .07 $f_2$.

The convergent front component of the rear member is preferably biconvex, the radius of curvature of the front surface of such component being greater than .4 $f_2$ and less than that of the rear surface thereof, which is in turn less than 3 $f_2$. The convergent rear component of the rear member is also preferably biconvex, the radii of curvature of its front and rear surfaces each lying between .5 $f_2$ and $f_2$.

The front member preferably consists of a doublet whose internal contact surface is collective and concave to the front. The material of the front element of the front member conveniently has mean refractive index at least .15 greater than that of the rear element thereof and Abbé V number at least 20 less than that of such rear element, the radius of curvature of the internal contact surface lying between .5 $f_1$ and 1.5 $f_1$, where $f_1$ is the equivalent focal length of the front member. The radius of curvature of the rear surface of the front member is preferably less than that of the internal contact surface and greater than .2 $f_1$, the radius of curvature of the front surface of the front member being greater than $f_1$.

Figure 2:
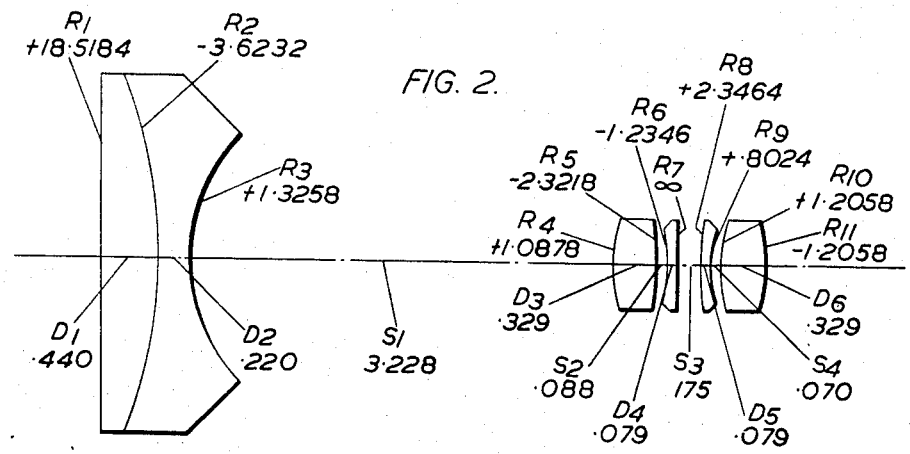

Figures 1 and 2 of the accompanying drawings respectively illustrate two convenient practical examples of objective according to the invention.

Numerical data for these examples are given in the following tables, in which $R_1$, $R_2$ . . . represent the radii of curvature of the surfaces of the objective, the positive sign indicating that the surface is convex to the front and the negative sign that it is concave thereto, $D_1$, $D_2$ . . . represent the axial thicknesses of the individual elements, and $S_1$, $S_2$ . . . represent the axial air separations between the components. The tables also give the mean refractive index $n_D$ for the D-line and the Abbé V number for the materials used for the various elements.

The insertion of equal (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

*Example 1*

[Equivalent focal length 1.000    Relative aperture F/2.5]

| Radius | Thickness or Air Separation | Refractive Index $n_D$ | Abbé V Number |
|---|---|---|---|
| $R_1 = \infty$ | | | |
| | $D_1 = .500$ | 1.7004 | 30.3 |
| $R_2 = -3.4483$ | | | |
| | $D_2 = .250$ | 1.5097 | 64.4 |
| $R_3 = +1.6542$ | | | |
| | $S_1 = 4.532$ | | |
| $R_4 = +1.2195$ | | | |
| | $D_3 = .375$ | 1.6098 | 53.3 |
| $R_5 = -2.7778$ | | | |
| | $S_2 = .100$ | | |
| $R_6 = -1.4085$ | | | |
| | $D_4 = .090$ | 1.7004 | 30.3 |
| $R_7 = \infty$ | | | |
| | $S_3 = .200$ | | |
| $R_8 = +2.5641$ | | | |
| | $D_5 = .090$ | 1.7004 | 30.3 |
| $R_9 = + .9009$ | | | |
| | $S_4 = .080$ | | |
| $R_{10} = +1.3755$ | | | |
| | $D_6 = .375$ | 1.6098 | 53.3 |
| $R_{11} = -1.3755$ | | | |

Example II

[Equivalent focal length 1.000    Relative aperture F/2.5]

| Radius | Thickness or Air Separation | Refractive Index $n_D$ | Abbé V Number |
|---|---|---|---|
| $R_1 = +18.5184$ | | | |
| | $D_1 = .440$ | 1.7004 | 30.3 |
| $R_2 = -3.6232$ | | | |
| | $D_2 = .220$ | 1.5097 | 64.4 |
| $R_3 = +1.3258$ | | | |
| | $S_1 = 3.228$ | | |
| $R_4 = +1.0878$ | | | |
| | $D_3 = .329$ | 1.6098 | 53.3 |
| $R_5 = -2.3218$ | | | |
| | $S_2 = .088$ | | |
| $R_6 = -1.2346$ | | | |
| | $D_4 = .079$ | 1.7004 | 30.3 |
| $R_7 = \infty$ | | | |
| | $S_3 = .175$ | | |
| $R_8 = +2.3464$ | | | |
| | $D_5 = .079$ | 1.7004 | 30.3 |
| $R_9 = +.8024$ | | | |
| | $S_4 = .070$ | | |
| $R_{10} = +1.2058$ | | | |
| | $D_6 = .329$ | 1.6098 | 53.3 |
| $R_{11} = -1.2058$ | | | |

The back focal length is 1.662 F in Example I and 1.512 F in Example II, where F is the equivalent focal length of the whole objective, and the equivalent focal lengths $f_1$ and $f_2$ of the front and rear members are respectively 4.0 F and 1.825 F in Example I and 3.5 F and 1.6 F in Example II, the front member being divergent and the rear member convergent, the distance from the surface $R_4$ of the front focal point of the rear member being 1.20 F in Example I and 1.04 F in Example II. The clear diameters of the front and rear members are respectively 2.85 F and .86 F in Example I and 2.70 F and .68 F in Example II, the diameter of the chamfer on the rear surface $R_3$ of the front member being 2.09 F in Example I and 1.84 F in Example II. The relative apertures of the front and rear members alone being $f_1/1.4$ and $f_2/2.1$ respectively in Example I and $f_1/1.3$ and $f_2/2.35$ in Example II.

The overall axial length of the rear member is 1.310 F or about .72 $f_2$ in Example I and 1.149 F or about .72 $f_2$ in Example II. The three axial air separations in the rear member are respectively about .055 $f_2$, .110 $f_2$ and .044 $f_2$ in both examples. The radii of curvature of the surfaces $R_4$, $R_5$, $R_6$, $R_9$, $R_{10}$, and $R_{11}$ are respectively .67 $f_2$, 1.52 $f_2$, .77 $f_2$, .50 $f_2$, .75 $f_2$ and .75 $f_2$ in Example I and .68 $f_2$, 1.45 $f_2$, .77 $f_2$, .50 $f_2$, .75 $f_2$ and .75 $f_2$ in Example II.

The equivalent focal length of the front two components of the rear member is 3.46 F in Example I and 3.03 F in Example II, and that of the rear two components thereof is 2.38 F in Example I and 2.09 F in Example II, so that the ratio between these focal lengths is about 1.45 in both examples. The mean curvature of the inner surfaces of the two divergent inner components of the rear member is .195/F in Example I and .21/F in Example II, and that of the inner surfaces of the two convergent outer components thereof is .54/F in Example I and .63/F in Example II.

In the front member, in both examples, the index difference is approximately .20 and the Abbé V number difference 3–4.1. The radii of curvature of the surfaces $R_2$ and $R_3$ are respectively .86 $f_1$ and .41 $f_1$ in Example I and 1.035 $f_1$ and .38 $f_1$ in Example II.

These examples are well-corrected to cover a semi-angular field of 25 degrees in Example I and 28 degrees in Example II, including good correction of the zonal aberrations and a reasonable degree of correction for distortion.

What I claim as my invention and desire to secure by Letters Patent is:

1. An optical objective of the inverted telephoto type, corrected for spherical and chromatic aberrations, coma, astigmatism and field curvature, and comprising a convergent rear member consisting of four components of which the outer two are convergent and the inner two simple and divergent, and a divergent front member located in front of the front focal point of the convergent rear member and including at least one collective surface concave to the front and at least one dispersive surface convex to the front, the two outer of the three air separations in the rear member each having the shape of a convergent meniscus lens with surfaces convex towards the central air separation of the rear member, the axial length of the rear member lying between .5 $f_2$ and 1.0 $f_2$, where $f_2$ is the equivalent focal length of the rear member, while the ratio of the equivalent focal length of the front two components of the rear member to that of the rear two components thereof lies between 1.25 and 1.75, the radius of curvature of the rear surface of the second component of the rear member being greater than twice that of the front surface of the third component thereof, and the radius of curvature of the front surface of the second component of the rear member being greater than 1.25 times that of the rear surface of the third component thereof.

2. An optical objective as claimed in claim 1, in which the front surface of the divergent second component of the rear member has radius of curvature greater than .5 $f_2$ and less than .75 times the radius of curvature of the rear surface of the convergent front component of the rear member the radius of curvature of such rear surface in turn being less than 4 $f_2$.

3. An optical objective as claimed in claim 2, in which the rear surface of the divergent third component of the rear member has radius of curvature greater than .3 $f_2$ and less than .8 times the radius of curvature of the front surface of the convergent rear component of the rear member the radius of curvature of such front surface in turn being less than 2 $f_2$.

4. An optical objective as claimed in claim 3, in which the three air separations in such member counting from the front have axial lengths respectively between .03 $f_2$ and .08 $f_2$, between .06 $f_2$ and .16 $f_2$, and between .02 $f_2$ and .07 $f_2$.

5. An optical objective as claimed in claim 1, in which the rear surface of the divergent third component of the rear member has radius of curvature greater than .3 $f_2$ and less than .8 times the radius of curvature of the front surface of the convergent rear component of the rear member the radius of curvature of such front surface in turn being less than 2 $f_2$.

6. An optical objective as claimed in claim 1, in which the axial length of the central separation of the rear member is less than .25 $f_2$, the mean curvature of the inner surface of the two divergent inner components of the rear member being less than that of the inner surfaces of the two convergent outer components thereof.

7. An optical objective as claimed in claim 1, in which the three air separations in the rear member counting from the front have axial lengths respectively between .03 $f_2$ and .08 $f_2$, between .06 $f_2$ and .16 $f_2$ and between .02 $f_2$ and .07 $f_2$.

8. An optical objective as claimed in claim 1, in which the convergent front component of the rear member is biconvex, the radius of curvature of the front surface of such component being greater than .4 $f_2$ and less than that of the rear surface thereof, which is in turn less than 3 $f_2$.

9. An optical objective as claimed in claim 1, in which the convergent rear component of the rear member is biconvex, the radius of curvature of each of the surfaces of such component lying between .5 $f_2$ and $f_2$.

10. An optical objective of the inverted telephoto type, corrected for spherical and chromatic aberrations, coma, astigmatism and field curvature, and comprising a convergent rear member consisting of four simple components of which the outer two are convergent and the inner two divergent, and a divergent front member located in front of the front focal point of the convergent rear member and including at least one collective surface concave to the front and at least one dispersive surface convex to the front, the two outer of the three air separations in the rear member each having the shape of a convergent meniscus lens with surfaces convex towards the central air separation of the rear member, the axial length of the rear member lying between .5 $f_2$ and 1.0 $f_2$, where $f_2$ is the equivalent focal length of the rear member while the ratio of the equivalent focal length of the front two components of the rear member to that of the rear two components thereof lies between 1.25 and 1.75.

11. An optical objective as claimed in claim 10, in which the front surface of the divergent second component of the rear member has radius of curvature greater than .5 $f_2$ and less than .75 times the radius of curvature of the rear surface of the convergent front component of the rear member, the radius of curvature of such rear surface in turn being less than 4 $f_2$ and the rear surface of the divergent third component of the rear member has radius of curvature greater than .3 $f_2$ and less than .8 times the radius of curvature of the front surface of the convergent rear component of the rear member the radius of curvature of such front surface in turn being less than 2 $f_2$.

12. An optical objective as claimed in claim 11, in which the three air separations in the rear member counting from the front have axial lengths respectively between .03 $f_2$ and .08 $f_2$, between .06 $f_2$ and .16 $f_2$, and between .02 $f_2$ and .07 $f_2$.

13. An optical objective as claimed in claim 10, in which the front surface of the divergent second component of the rear member has radius of curvature greater than .5 $f_2$ and less than .75 times the radius of curvature of the rear surface of the convergent front component of the rear member, the radius of curvature of such rear surface in turn being less than 4 $f_2$ and the rear surface of the divergent third component of the rear member has radius of curvature greater than .3 $f_2$ and less than .8 times the radius of curvature of the front surface of the convergent rear component of the rear member the radius of curvature of such front surface in turn being less than 2 $f_2$.

14. An optical objective as claimed in claim 10, in which the three air separations in the rear member counting from the front have axial lengths respectively between .03 $f_2$ and .08 $f_2$, between .06 $f_2$ and .16 $f_2$, and between .02 $f_2$ and .07 $f_2$.

15. An optical objective as claimed in claim 10, in which the convergent front component of the rear member is biconvex, the radius of curvature of the front surface of such component being greater than .4 $f_2$ and less than that of the rear surface thereof, which is in turn less than .3 $f_2$, and the convergent rear component of the rear member is biconvex, the radius of curvature of each of the surfaces of such component lying between .5 $f_2$ and $f_2$.

16. An optical objective of the inverted telephoto type, corrected for spherical and chromatic aberrations, coma, astigmatism and field curvature, and comprising a convergent rear member consisting of four simple components of which the outer two are convergent and the inner two divergent, and a divergent front member located in front of the front focal point of the convergent rear member and including at least one collective surface concave to the front and at least one dispersive surface convex to the front, the two outer of the three air separations in the rear member each having the shape of a convergent meniscus lens with surfaces convex towards the central air separation of the rear member, the axial length of such central air separation being less than .25 $f_2$, where $f_2$ is the equivalent focal length of the rear member, at least one of the two divergent inner components of the rear member being of meniscus form, while the overall axial length of the rear member lies between .5 $f_2$ and 1.0 $f_2$, the ratio of the equivalent focal length of the front two components of the rear member to that of the rear two components thereof lying between 1.25 and 1.75.

17. An optical objective as claimed in claim 16, in which the front surface of the divergent second component of the rear member has radius of curvature greater than .5 $f_2$ and less than .75 times the radius of curvature of the rear surface of the convergent front component of the rear member, the radius of curvature of such rear surface in turn being less than 4 $f_2$ and the rear surface of the divergent third component of the rear member has radius of curvature greater than .3 $f_2$ and less than .8 times the radius of curvature of the front surface of the convergent rear component of the rear member the radius of curvature of such front surface in turn being less than 2 $f_2$.

18. An optical objective as claimed in claim 17, in which the three air separations in such member counting from the front have axial lengths respectively between .03 $f_2$ and .08 $f_2$, between .06 $f_2$ and .16 $f_2$, and between .02 $f_2$ and .07 $f_2$.

19. An optical objective as claimed in claim 16, in which the curvature of the rear surface of the second component of the rear member is numerically less than the reciprocal of 3 $f_2$.

20. An optical objective as claimed in claim 16, in which the radius of curvature of the front surface of the second component of the rear member is less than that of the front surface of the third component thereof and is greater than 1.25 times that of the rear surface of such third component the radius of curvature of the said front surface of the third component in turn being less than 3 $f_2$, whilst the radius of curvature of the said rear surface of the third component is in turn greater than .25 $f_2$.

21. An optical objective as claimed in claim 16, in which the mean curvature of the inner surfaces of the two divergent inner components of the rear member is less than that of the inner surfaces of the two convergent outer components thereof which in turn is less than twice the reciprocal of $f_2$.

22. An optical objective as claimed in claim 16, in which the three air separations in such member counting from the front have axial lengths respectively between .03 $f_2$ and .08 $f_2$, between .06 $f_2$ and .16 $f_2$, and between .02 $f_2$ and .07 $f_2$.

23. An optical objective as claimed in claim 16, in which the convergent front compartment of the rear member is biconvex, the radius of curvature of the front surface of such component being greater than .4 $f_2$ and less than that of the rear surface thereof, which is in turn less than 3 $f_2$, and the convergent rear component of the rear member is biconvex, the radius of curvature of each of the surfaces of such component lying between .5 $f_2$ and $f_2$.

24. An optical objective of the inverted telephoto type, corrected for spherical and chromatic aberrations, coma, astigmatism and field curvature, and comprising a convergent rear member consisting of four simple components of which the outer two are convergent and the inner two divergent, and a divergent front member located in front of the front focal point of the convergent rear member and consisting of a doublet whose internal contact surface is collective and concave to the front and has radius of curvature lying between .5 $f_1$ and 1.5 $f_1$, where $f_1$ is the equivalent focal length of the front member, the two outer of the three air separations in the rear member each having the shape of a convergent meniscus lens with surfaces convex towards the central air separation of the rear member, the axial length of the rear member lying between .5 $f_2$ and 1.0 $f_2$, where $f_2$ is the equivalent focal length of the rear member, the ratio of the equivalent focal length of the front two components of the rear member to that of the rear two components thereof lying between 1.25 and 1.75.

25. An optical objective as claimed in claim 24, in which the radius of curvature of the rear surface of the front member is less than that of the internal contact surface thereof and greater than .2 $f_1$, whilst the radius of curvature of the front surface of the front member is greater than $f_1$.

References Cited in the file of this patent

UNITED STATES PATENTS

| | | |
|---|---|---|
| 1,565,205 | Rudolph | Dec. 8, 1925 |
| 1,897,262 | Kitroser | Feb. 14, 1933 |
| 1,955,590 | Lee | Apr. 17, 1934 |
| 2,126,126 | Merte | Aug. 9, 1938 |
| 2,247,068 | Richter | June 24, 1941 |
| 2,559,844 | Bennett | July 10, 1951 |

FOREIGN PATENTS

| | | |
|---|---|---|
| 388,215 | Great Britain | Feb. 23, 1933 |